May 16, 1939.  S. W. LONG  2,158,372
SPRING HOOK
Filed Aug. 3, 1936  2 Sheets-Sheet 1
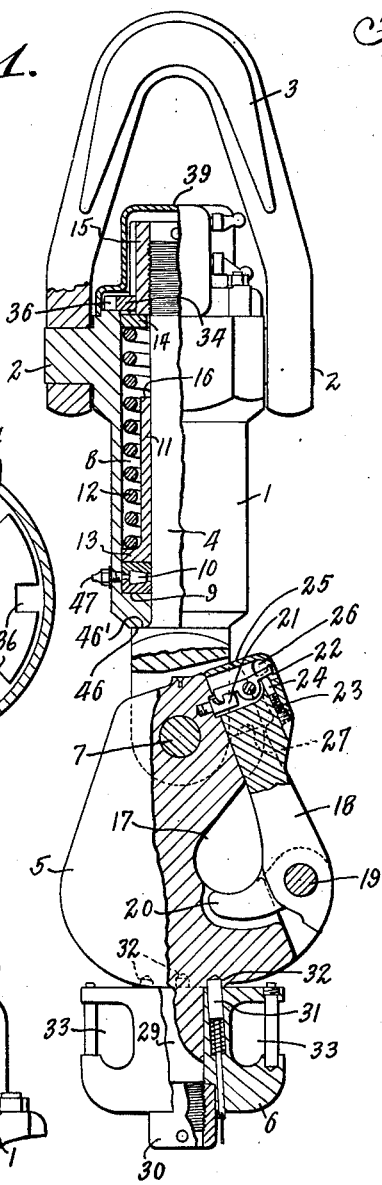
Fig. 1.
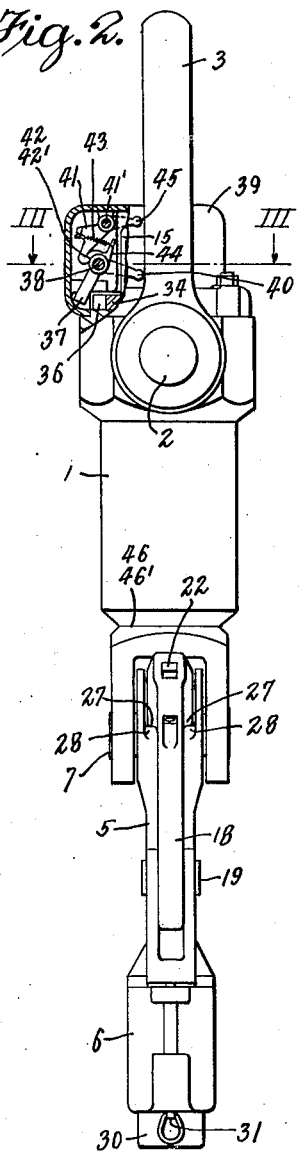
Fig. 2.
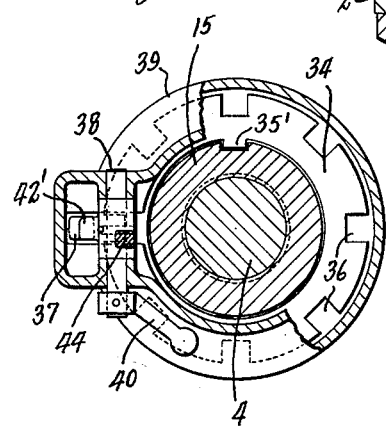
Fig. 3.
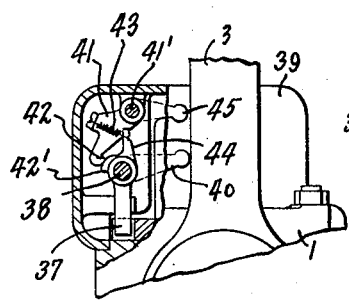
Fig. 2ª.
Inventor
Spencer W. Long.
By Lyon & Lyon
Attorneys May 16, 1939.  S. W. LONG  2,158,372
SPRING HOOK
Filed Aug. 3, 1936  2 Sheets-Sheet 2
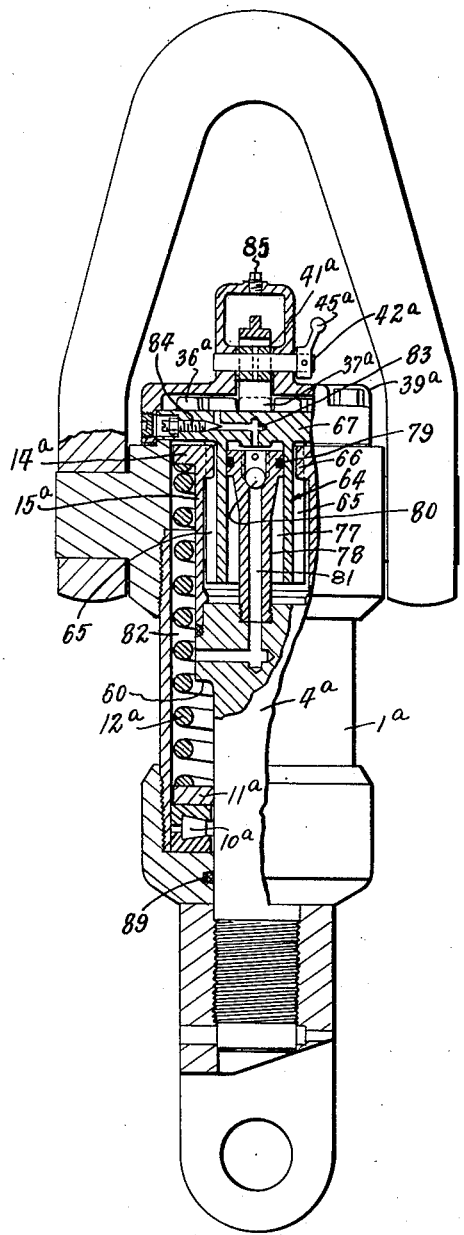
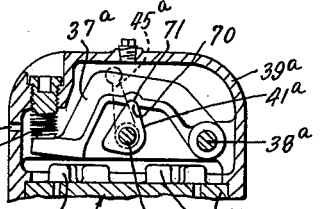
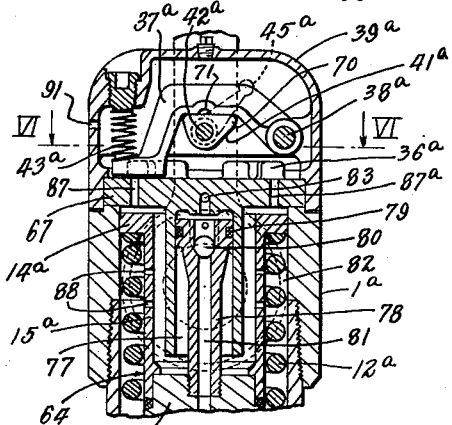
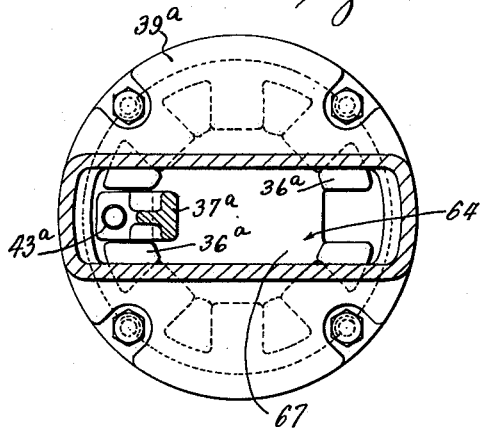
Inventor
Spencer W. Long
By Lyon & Lyon
Attorneys Patented May 16, 1939

2,158,372

UNITED STATES PATENT OFFICE 2,158,372

SPRING HOOK

Spencer W. Long, Redondo Beach, Calif., assignor, by mesne assignments, to The National Supply Company, Pittsburgh, Pa., a corporation of Pennsylvania Application August 3, 1936, Serial No. 94,011

12 Claims. (Cl. 294—82)

This invention relates to spring hooks, and more particularly to spring hooks adaptable for use in connection with rotary drilling operations.

This invention is directed to an improvement over that type and form of spring hook illustrated in Letters Patent Nos. 2,058,186 and 2,058,187, to John D. Spalding.

An object of this invention is to provide a spring hook having an improved rotation lock operable to permit reciprocation of the hook relative to its support while permitting the hook to be rotated or locked against rotation as desired.

Another object of this invention is to provide a hook wherein the thrust bearing is positioned within an enclosure and so positioned as to permit easy and adequate lubrication thereof.

Another object of this invention is to provide a spring hook wherein the parts or elements are so arranged and proportioned as to permit the use of a relatively long large diameter spring.

Another object of this invention is to provide a spring hook including a novel snubbing device operable to prevent objectionable recoil when a load is removed from the hook and the spring of the hook is under compression.

Other objects and advantages of this invention it is believed will be apparent from the following detailed description of a preferred embodiment thereof as illustrated in the accompanying drawings.

In the drawings:

Figure 1 is a side elevation partly in vertical section of the rotary spring hook embodying my invention.

Figure 2 is a side elevation taken at substantially 90° from the position of Figure 1 wherein parts are cut away to illustrate the rotation locking device of my invention.

Figure 2—A is an enlarged fragmental section illustrating the locking means embodied in my invention in engaged position.

Figure 3 is an end sectional view taken substantially on the line 3—3 of Figure 2.

Figure 4 is a side elevation partly in vertical section of a modified form of my invention.

Figure 5 is an enlarged fragmental section taken substantially 90° from the position illustrated in Figure 4 illustrating partly in section the snubbing and locking means embodying my invention.

Figure 6 is a sectional end view taken substantially on the line 6—6 of Figure 5.

Figure 7 is an enlarged fragmental sectional view illustrating the modified form of locking means embodied in my invention in disengaged position.

In the embodiment of my invention as illustrated in Figures 1 to 3, the body 1 is provided with trunnions 2 upon which a bail 3 is journaled. Extending through the body 1 is a shank 4 which supports at its lower end a hook member 5 and a yoke 6. A pin 7 pivotally connects the shank 4 of the hook 5, permitting the hook to swing freely with respect to the shank 4.

The body 1 is formed with a central bore 8 terminated at its lower end in a shoulder 9. Supported by the shoulder 9 is an anti-friction thrust bearing 10 upon which a sleeve 11 is rotatably supported. The sleeve 11 extends upwardly in the bore 8 and surrounds a portion of the shank 4 and is slidably mounted relative to the shank 4. An elongated relatively large coil spring 12 engages at its lower end the outwardly extending annular flange 13 of the sleeve 11 and at its upper end engages an annular stop plate 14. The annular stop plate 14 is engaged by the lower end of the collar 15 which is threaded to the upper end of the shank 4.

By this construction the means which limits the travel of the shank 4 longitudinally of the body 1 is positioned within the coil spring 12. To limit the longitudinal movement of the shank 4, the stop plate 14 engages the upper end 16 of the sleeve 11 when a predetermined load is supported at the lower end of the shank 4. Further loading beyond a predetermined load does not cause further compression in the spring 12 but the load is taken directly through the sleeve 11 and bearing 10 to the body 1. The upward travel of the shank 4 is limited by engagement of the shoulder 46 with the shoulder 46' at the lower end of the body 1.

With the hook constructed as above set forth, a relatively long large outside diameter spring may be employed which permits the long stroke or travel of the shank 4 relative to the body 1 without subjecting the material in the spring to an excessive range of stress. The placing of the spring outside of the stop means also permits the use of a larger diameter spring without increasing the size of the body 1.

The positioning of the thrust bearing 10 in the lower end of the body 1 permits of the proper support of the thrust bearing 10 and likewise the provision of means for adequate lubrication thereof. In order to properly lubricate the bearing 10, a lubricant fitting 47 is provided in the body 1 through which lubricant may be introduced to the bearing 10. The hook member 5 which is pivoted to the lower end of the shank 4 has a bail receiving opening 17 closed by a bill 18. The bill 18 is pivotally secured to the hook 5 at a pivot 19 and is provided with a finger 20 which keeps the bill in closed position as long as there is a load on the hook supported within the opening 17. The finger 20 also acts automatically to close the bill 18 when the bail of a swivel or other load is inserted into the opening 17.

The bill 18 is provided with shoulders 27 which fit into corresponding recesses 28 in the hook member 5 to sustain a portion of the load imposed on the hook 5. A releasable latching means is provided on the free end of the bill 18. A stationary latch member 21 is carried by the hook 5. A pivoted latch member 22 is carried by the bill 18. A spring 23 acting against a plunger 24 operates to maintain the pivoted latch member 22 in position to latch with the stationary latch member 21.

A guard 25 is provided preferably formed integral with the bill 18 to guard against accidental operation of the latch member 22. An opening 26 is provided in the guard 25 to allow the entrance of a latch releasing hook preferably carried at the end of a pole to enable the latch member 22 to be manually actuated by an operator.

In opening the hook 5 it is only necessary for the operator to thrust the latch releasing hook into the opening 26 and pull downwardly. This operation results in releasing the latch member 22 and likewise pivoting the bill 18 upon the pivot 19. It will likewise be apparent that the latch member 22 automatically engages the latch member 21 when the bill 18 is closed.

Formed integral with the hook 5 is a trunnion 29 upon which the elevator bail supporting yoke 6 is journaled. The collar 30 threaded to the end of the trunnion 29 maintains the yoke 6 in position.

Means are provided for locking the yoke 6 in a plurality of positions, which means preferably includes a spring operated plunger 31 which is adapted to be engaged within a series of locking recesses 32 formed in the body of the hook 5. The yoke member provides a pair of openings 33 which are adapted to receive the bails of an elevator as will be readily understood by one skilled in the art.

Means are provided for locking the shank 4 from rotation relative to the body 1 when desired and which means likewise permit of the relative longitudinal movement of the shank 4 and body 1 when the lock means for preventing rotation is in either the locked or the unlocked position. This means preferably includes a floating lock ring 34 which is splined with a spline 35' to the collar 15. The lock ring 34 has a series of locking recesses 36 formed in its periphery to receive the lock member 37. The lock member 37 is pivotally supported on a pin 38 within the cap 39. Secured to the pin 38 on the exterior of the cap 39 is an operating lever 40.

Means are provided for yieldably urging a latch member in position to latch the lock member 37 in disengaged position or to yieldably urge the latch member 37 into engaged position when the latch member is released, which means are preferably of the following construction:

The latch member 41 is journaled in the cap member on a pin 41'. Complementary latching surfaces 42 and 42' are formed on the latch member 41 and locking member 37 respectively. A spring 43 is connected between the latch member 41 and an extension 44 of the locking member 37.

Secured to the pin 41' exterior of the cap 39 is a latch actuating lever 45. To lock the shank 4 against rotation it is only necessary for the operator to pull down on the lever 45. This action actuates the locking member 41 in position to disengage the complementary locking faces 42 and 42'. The spring 43 then urges the lock member 37 in position in engagement with one of the lock recesses 36, this engagement taking place when one of the recesses 36 revolves into position. To retrieve the lock member 37 and permit the shank 4 to rotate, it is only necessary for the operator to pull down on the lever 40.

The complementary engaging faces 42 and 42' automatically engage to maintain the lock member 37 out of engaging position and the spring 43 holds them in their latched position.

In the modification of my invention illustrated in Figures 4 to 6, similar parts have been numbered with similar numerals with the addition of an exponent "a" thereto.

In this modification the pivoted hook assembly as illustrated in Figures 1 to 3 has been omitted. The hook assembly may be identical with that illustrated in Figures 1 to 3, or may be of other construction. In this modification of my invention the bearing 10ᵃ is supported in the lower part of the body 1ᵃ. The spring 12ᵃ engages a stop plate 11ᵃ supported by the bearing 10ᵃ. The spring 12ᵃ at its opposite end engages the annular flange 14ᵃ of the sleeve 15ᵃ. The sleeve 15ᵃ is secured to the upper end of the shank 4ᵃ. Formed on the shank 4ᵃ is a stop shoulder 60. The stop shoulder 60 provides the means which limit the longitudinal movement of the shank 4ᵃ relative to the body 1ᵃ and the stop shoulder 60 is located within the spring 12ᵃ.

Supported upon the body 1ᵃ and free to rotate therein is a spider 64 which is provided with a plurality of vertically extending keyways 65. Corresponding keys 66 are formed upon the sleeve 15ᵃ which serve to prevent relative rotation between the sleeve 15ᵃ and the spider 64, yet permit of relative longitudinal movement between them.

Formed integrally with the end flange 67 are locking lugs 36ᵃ. Adapted to engage with the locking lugs 36ᵃ is a locking member 37ᵃ. The locking member 37ᵃ is pivotally mounted within the cap 39ᵃ upon a pin 38ᵃ. Mounted within the cap 39ᵃ upon a pin 42ᵃ is a cam 41ᵃ. The cam 41ᵃ has an engaging nose 70 adapted to fit within a recess 71 formed in the locking member 37ᵃ. Secured to the pin 42ᵃ exterior of the cap 39ᵃ is an operating lever 45ᵃ. A spring 43ᵃ is interposed between the cap 39ᵃ and the locking member 37ᵃ.

In actuating the locking member 37ᵃ to or from engaging position, the lever 45ᵃ is actuated to rotate the cam 41ᵃ until the nose 70ᵃ engages within the recess 71 with the result that the locking member 37ᵃ is lifted from engaging position with the locking lugs 36ᵃ. When the operating lever 45ᵃ is again actuated to release the nose of the cam 70 from the recess 71, the spring 43ᵃ urges the locking member 37ᵃ into lug-engaging position, this engagement taking place when one of the locking lugs 36ᵃ revolves into position.

In order to check excessive recoil of the spring 12ᵃ when the load is released from the shank 4ᵃ, I have provided a snubbing device preferably of the following construction:

While this snubbing device is only indicated as incorporated in the embodiment of my invention illustrated in Figures 4, 5 and 6, it is obvious that it might equally well be incorporated in the other modification of my invention.

The snubbing device preferably includes a piston member 78 which is secured to the upper end of the shank 4ª. The piston member 78 is mounted within the cylinder 77 formed on the interior of the spider 64. The piston 78 is provided with any suitable form of piston packing or ring 79 and carries a check valve 80. A passageway 81 within which the check valve 80 is mounted connects the annular cavity 82, within which the spring 12ª is mounted, with the cylinder 77. The passageway 83 is formed in the spider 64 and this passageway is adjustably controlled as to restriction by a needle valve 84. The fluid, preferably oil, is introduced into the body of the hook through an opening normally closed by a plug 85. Ports 87, 88 permit the oil to reach the annular cavity 82. Packing 89 is provided in the bearing support of the bearing 10ª to prevent leakage at this point. In order to prevent air lock or to vent the structure, a vent 91 is provided in the cap 39ª which is open to the atmosphere.

In the snubbing operation the hook embodying my invention operates as follows:

The shank 4ª, when moving downwardly, moves without appreciable impedance of the snubbing device while movement in the upper direction is materially retarded. When the shank 4ª moves downward, the check valve 80 unseats and allows fluid to pass upwardly through the passage 81 and into the space 77 between the upper end of the piston 78 and the end flange 67 of the spider 64. When the shank 4ª moves upwardly, the check valve 80 seats and forces the entrapped oil through the restricted passage 83, thus effectively retarding the recoil of the spring 12ª The relative amount of impedance to the recoil of the spring 12ª can be determined by adjusting the setting of the needle valve 84.

Having fully described my invention, it is to be understood that I do not wish to be limited to the details herein set forth, but my invention is of the full scope of the appended claims.

I claim:

1. A rotation lock device for two relatively rotatable members incuding, a pivoted locking lever carried by one of said members, the configuration of the other of said members being such as to provide a locking position for engagement with said lever, latch means including a spring to hold the lever out of engagement with the latter said member, the spring being adapted to resiliently urge the lever into locking engagement upon the release of the latch means.

2. In a hook, the combination of a body, a shank supported thereby and adapted normally to rotate relatively thereto, a floating member slidably and non-rotatively mounted relative to said shank and provided with an interrupted surface, locking means carried by the body including a pivoted member which is adapted to engage the interrupted surface, releasable latch means associated with the pivoted member normally adapted to hold the pivoted member out of such engagement, and a spring associated with the pivoted member and the latch means adapted to resiliently urge said pivoted member into such engagement upon the release of the latch means.

3. In a device of the class described, a body, a shank supported therein, a locking element slidably mounted relative to the shank and provided with an interrupted surface, locking means carried by the body including a pivoted member adapted to releasably engage the interrupted surface, a releasable latch member associated with the pivoted member, and single means associated with the members to resiliently urge the latch member into positive latching engagement, and to resiliently urge the pivoted member into engagement with the locking element upon the release of the latch member.

4. In a device of the class described, a body, a shank supported therein, a locking element slidably and non-rotatively mounted relative to the shank, locking means carried by the body including a pivoted member, the configuration of the locking element being such as to provide a locking position for engagement with the pivoted member, a cam operable to move the pivoted member out of such engagement, a spring associated with the pivoted member adapted to resiliently urge the member into its engaged position.

5. In a hook, the combination of a body, a shank rotatably supported therein, a floating member within the body slidably and non-rotatively mounted relative to the shank, locking means carried within the body including a pivoted member adapted to prevent relative rotation between the floating member and the body, the configuration of the floating member being such as to provide a locking position for engagement with the pivoted member, spring means adapted to urge the pivoted member into locking engagement, and a lever positioned outside the body operatively associated with the pivoted member and adapted to move it into its unlocked position against the action of the spring.

6. In a hook, the combination of a body, a shank rotatably supported therein, a floating member within the body slidably and non-rotatively mounted relative to the shank, locking means carried within the body including a pivoted member adapted to prevent relative rotation between the floating member and the body, the configuration of the floating member being such as to provide a locking position for engagement with the pivoted member, spring means adapted to urge the pivoted member into locking engagement, a lever positioned outside the body operatively associated with said pivoted member and adapted to move it into its unlocked position against the action of the spring, and positive means to hold said pivoted member in its unlocked position.

7. In a device of the class described, the combination of a supporting member, a hook carrying member carried by the supporting member and adapted for longitudinal movement relative thereto, yieldable means between said members for resisting longitudinal movement of the hook carrying member relative to the supporting member, an element carried by one of the members and provided with a cylindrical chamber, a restricted outlet passage in a wall of said chamber, a piston carried by the other of said members and adapted for longitudinal movement within the chamber, a check valve adapted to allow the entrance of fluid into the chamber upon descent of the hook carrying member, the check valve being adapted to close upon ascent of the hook carrying member, and thereby force the entrapped fluid to escape through the restricted passage.

8. In a device of the class described, the combination of a supporting body having an annular bore, a hook carrying shank supported within the bore and adapted for limited longitudinal movement relative to the body, yieldable means within the bore for resisting such movement, a member carried by the body and adapted to have a telescopic connection with the upper end of the shank, the connection being such as to provide a chamber between the telescoping parts, a restricted outlet passage in a wall of said chamber, a check valve to allow the free passage of a fluid into the chamber upon the descent of the shank, the check valve being adapted to close upon ascent of the shank, and thereby force the entrapped fluid to escape through said restricted passage.

9. A rotation lock device for two relatively rotatable members including, a pivoted locking lever carried by one of said members, the configuration of the other of said members being such as to provide a locking position for engagement with said lever, latch means including a spring to hold the lever out of engagement with the latter said member, the spring being adapted to resiliently urge the lever into locking engagement upon the release of the latch means, said engagement being effected upon the latter said member revolving into proper position.

10. In a device of the class described, the combination of a body, a shank rotatably supported on the body, a member associated with said shank and adapted to rotate therewith, said member having an interrupted surface, locking means mounted within the body including a pivoted lock member which is adapted to engage said interrupted surface, a lever accessible exteriorly of the body and adapted to actuate the lock member, and resilient means associated with the lock member whereby the lever may be moved to its locking position independent of the relative angular position of the body and shank.

11. In a device of the class described, the combination of a body having a central bore terminating at its lower end in an annular shoulder, a load carrying shank extending through said bore and provided with an abutment, a rotatable thrust bearing positioned on said shoulder, a resilient member and a non-resilient member positioned in coaxial alignment within said bore, the resilient member surrounding both said shank and said non-resilient member, said members each being operatively interposed between said thrust bearing and said abutment, whereby the non-resilient member acts to limit the compression of the resilient member, upon downward movement of said shank.

12. In a device of the class described, the combination of a body pivotally supported by a bail, said body having a central bore terminating at its lower end in an annular shoulder, said shoulder being positioned substantially below the pivotal supporting axis of said bail, a load-carrying member extending through said bore and provided with an abutment, a rotatable thrust bearing positioned on said shoulder, a spring positioned within said bore and operatively interposed between said thrust bearing and said abutment, and a stop-member supported on said thrust bearing and positioned to limit downward movement of the load-carrying member relative to the body.

SPENCER W. LONG.